(12) United States Patent
Rönfanz et al.

(10) Patent No.: US 11,180,043 B2
(45) Date of Patent: Nov. 23, 2021

(54) CHARGING CABLE AND CHARGING STATION FOR ELECTRIC CARS

(71) Applicant: Dr. Ing. h.c. F. Porsche Aktiengesellschaft, Stuttgart (DE)

(72) Inventors: Jari Rönfanz, Stuttgart (DE); Volker Reber, Michelbach an der Bilz (DE); Stefan Götz, Forstern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 191 days.

(21) Appl. No.: 16/245,478

(22) Filed: Jan. 11, 2019

(65) Prior Publication Data

US 2019/0217731 A1   Jul. 18, 2019

(30) Foreign Application Priority Data

Jan. 16, 2018  (DE) .......................... 102018100827.9

(51) Int. Cl.

| | |
|---|---|
| *B60L 53/16* | (2019.01) |
| *H01B 7/42* | (2006.01) |
| *H01R 31/06* | (2006.01) |
| *B60L 53/18* | (2019.01) |
| *H01B 9/00* | (2006.01) |
| *H01R 13/11* | (2006.01) |
| *H01R 13/42* | (2006.01) |

(Continued)

(52) U.S. Cl.
CPC .............. *B60L 53/16* (2019.02); *B60L 53/18* (2019.02); *H01B 7/423* (2013.01); *H01B 9/006* (2013.01); *H01R 13/111* (2013.01); *H01R 13/42* (2013.01); *H01R 13/44* (2013.01); *H01R 13/502* (2013.01); *H01R 13/665* (2013.01); *H01R 31/06* (2013.01); *H01R 13/005* (2013.01); *H01R 13/6272* (2013.01); *H01R 2201/26* (2013.01)

(58) Field of Classification Search
CPC ...... H01R 13/111; H01R 13/42; H01R 13/44; H01R 13/665; H01R 13/639; H01R 13/506; H01R 13/502; H01R 31/06; H01R 13/005; B60L 53/16; H01B 7/423
See application file for complete search history.

(56) References Cited

U.S. PATENT DOCUMENTS

| | | | |
|---|---|---|---|
| 3,271,725 A | 9/1966 | Bloch | |
| 5,614,808 A * | 3/1997 | Konoya | ................. B60L 53/16 320/109 |

(Continued)

FOREIGN PATENT DOCUMENTS

| | | |
|---|---|---|
| CN | 105896212 A | 8/2016 |
| CN | 106409420 A | 2/2017 |

(Continued)

OTHER PUBLICATIONS

Chinese Office Action for Chinese Application No. 201910026529.3, dated Mar. 9, 2020, 8 pages.

*Primary Examiner* — Renee S Luebke
*Assistant Examiner* — Paul D Baillargeon
(74) *Attorney, Agent, or Firm* — RatnerPrestia

(57) ABSTRACT

A charging cable for an electric car includes an insulating body, a connecting line, and a plug-type connector with contact pins and contact openings. The plug-type connector detachably connects the insulating body to the connecting line via the contact pins and contact openings. Also described is a corresponding charging station.

11 Claims, 5 Drawing Sheets

(51) Int. Cl.
*H01R 13/502* (2006.01)
*H01R 13/00* (2006.01)
*H01R 13/627* (2006.01)
*H01R 13/44* (2006.01)
*H01R 13/66* (2006.01)

(56) References Cited

U.S. PATENT DOCUMENTS

| | | | |
|---|---|---|---|
| 6,220,955 B1 * | 4/2001 | Posa | F21V 29/56 |
| | | | 454/184 |
| 6,358,096 B1 | 3/2002 | Beckman | |
| 6,371,768 B1 * | 4/2002 | Neblett | H01R 13/701 |
| | | | 439/34 |
| 7,070,417 B2 * | 7/2006 | Meleck | H01R 13/6271 |
| | | | 439/163 |
| 7,592,546 B2 * | 9/2009 | Johansson | B60R 16/0215 |
| | | | 174/95 |
| 9,080,246 B2 * | 7/2015 | Volkov | C25D 5/02 |
| 9,168,822 B2 * | 10/2015 | Ichikawa | B60L 53/22 |
| 9,321,362 B2 * | 4/2016 | Woo | B60L 53/11 |
| 9,434,257 B2 * | 9/2016 | Kinomura | B60L 3/04 |
| 10,081,262 B2 | 9/2018 | Nagel et al. | |
| 2001/0034147 A1 | 10/2001 | Kerr et al. | |
| 2011/0260684 A1 * | 10/2011 | Xiaofeng | A61K 45/06 |
| | | | 320/109 |
| 2015/0035483 A1 | 2/2015 | Mueller et al. | |
| 2017/0001529 A1 | 1/2017 | Fuchs et al. | |
| 2017/0028862 A1 | 2/2017 | Nagel et al. | |
| 2017/0162972 A1 | 6/2017 | Kim et al. | |
| 2018/0264957 A1 * | 9/2018 | Fuehrer | B60L 53/16 |
| 2019/0074620 A1 * | 3/2019 | Moseke | B60L 53/18 |

FOREIGN PATENT DOCUMENTS

| | | |
|---|---|---|
| CN | 206820162 U | 12/2017 |
| DE | 102010041314 A1 | 3/2012 |
| DE | 102011106335 A1 | 1/2013 |
| DE | 102013007330 A1 | 10/2014 |
| DE | 102014201764 A1 | 8/2015 |
| DE | 102015112347 A1 | 2/2017 |
| DE | 102016204895 A1 | 9/2017 |
| DE | 102016003652 A1 | 10/2017 |
| DE | 102016107409 A1 | 10/2017 |
| DE | 102016210721 A1 | 12/2017 |
| EP | 2555340 A1 | 2/2013 |
| JP | 2016509824 A | 3/2016 |

* cited by examiner

CHARGING CABLE AND CHARGING STATION FOR ELECTRIC CARS

CROSS-REFERENCE TO RELATED APPLICATION

This application claims priority to German Patent Application No. DE 10 2018 100 827.9, filed Jan. 16, 2018, which is incorporated by reference herein in its entirety.

FIELD OF THE INVENTION

The present invention relates to a charging cable for electric cars. In addition, the present invention relates to a corresponding charging station.

BACKGROUND OF THE INVENTION

The term charging station is used in electrical engineering to refer to any fixed device or electrical installation which serves to feed energy to mobile battery-operated devices, machines or motor vehicles by means of simple setting or plugging in without having to remove the energy storage element, for example the traction battery of an electric car. Charging stations for electric cars are occasionally also referred to as "electric filling stations" and can comprise a plurality of charging points.

In particular DC fast charging systems (high performance charging, HPC) such as the so-called combined charging system (CCS) which is widespread in Europe are known in this context. In the case of DC charging of the generic type, DC current is fed from the charging pillar directly into the vehicle and for this purpose is made available from the power grid by means of a high-power rectifier or by means of large buffering accumulators at solar charging stations. In the vehicle there is a battery management system which communicates with the charging pillar in order to adapt the strength of the current or to end the process when a capacity limit is reached.

The power electronics are usually located in the charging pillar here. Since the DC connections of the charging pillar are connected directly to corresponding connections of the traction battery, high charging currents can be transmitted with low loss, which permits short charging times, but also generates a considerable amount of waste heat.

For this purpose, a wide variety of charging cables and charging couplings and charging plugs, which are typically subjected to a high degree of wear, are known. In particular, the contact pins ("pins") are subjected to a high amount of abrasion as a result of the high number of plugging cycles during daily use. However, the wearing of the pins puts the reliable contact at risk, in particular during the conduction of signals which are transmitted with low voltage. The plastic shell and the pin mount are subjected not only to mechanical wear as a result of the frequent plugging cycles and the forces acting on the pin fixtures but also to degradation by weathering effects, light, oxygen and other oxidizing agents. It is to be borne in mind here that these components perform an insulating function which is critical for safety. In this context, they are occasionally subjected to considerable mechanical loading, in particular as a result of the plug being dropped on the ground. The cable as a relatively flexible element copes significantly better with this than the plug.

Complete replacement of the plug in regular cycles is therefore customary in the industry, but very costly and time consuming. If the plug is replaced with the cable, the charging pillars have to generally be opened in order to newly connect all the signal conductors and power conductors and to newly configure the cable routing, possible strain relief means or suspension means. If, on the other hand, only the plug and the worn pins are replaced, generally the line ends have to be shortened and the new pins soldered or crimped. In situ, these methods prove laborious and susceptible to quality problems. In addition, whenever pins are replaced, the cable lengths are undesirably reduced. After the selective replacement of individual pins, the lines additionally have different line lengths.

Owing to the high level of expenditure when replacing charging cables in the field, to a certain extent cost-intensive resistant materials, for example gold-nickel pins and degradation-resistant plastics are therefore used for the plug housings, which, however, can only delay the replacement but not prevent it.

CN105896212, DE102011106335, DE102013007330, EP255534081 and US2015035483, all of which are incorporated by reference herein, disclose electric vehicle charging plugs with replaceable sections.

SUMMARY OF THE INVENTION

Described herein is a charging cable for electric cars and a corresponding charging station.

The charging plug is divided into at least one part with a high level of wear and/or high safety function or high safety significance and at least one part with a relatively low wear and/or a relatively low safety function or low safety significance. The part of the charging plug with a high level of wear and/or high safety function or high safety significance is correspondingly configured in a replaceable fashion.

For example, according to aspects of the invention the main part of the plug which is introduced into the mechanical receptacle in the vehicle and is therefore subjected to mechanical abrasion and loading is replaceable. It is advantageous here that as far as possible all the sensitive parts (if appropriate also easily fracturing parts of the housing) are part of the replaceable part, but on the other hand are replaced as little as possible, in order to limit the costs of the part. The plug body or insulating body can contain, in particular, pins which are also replaced with the insulating body. If the insulating body is fitted on over the plug like a mask, pins, which are particularly susceptible to wear owing to the frequent plug-in processes with changing vehicles, can be connected to the plug by means of high-quality contact pins with only a few plugging cycles. These additional pins require only a very small number of plugging cycles here, since they are plugged only when the insulating body is changed.

Therefore, the insulating body and at least one pin can be configured in such a way that they can be plugged onto the plug body. In this case, the insulating body should preferably be secured to the plug, for example by means of screws, clamping springs or rivets. The secured connection can preferably not be detached by third parties, for example by using unusual screw heads, rivets, chemically detachable bonding of the screws or a lock.

BRIEF DESCRIPTION OF THE DRAWING

Exemplary embodiments of the invention are illustrated in the drawings and will be described in more detail below.

DETAILED DESCRIPTION OF THE INVENTION

Figure 1:
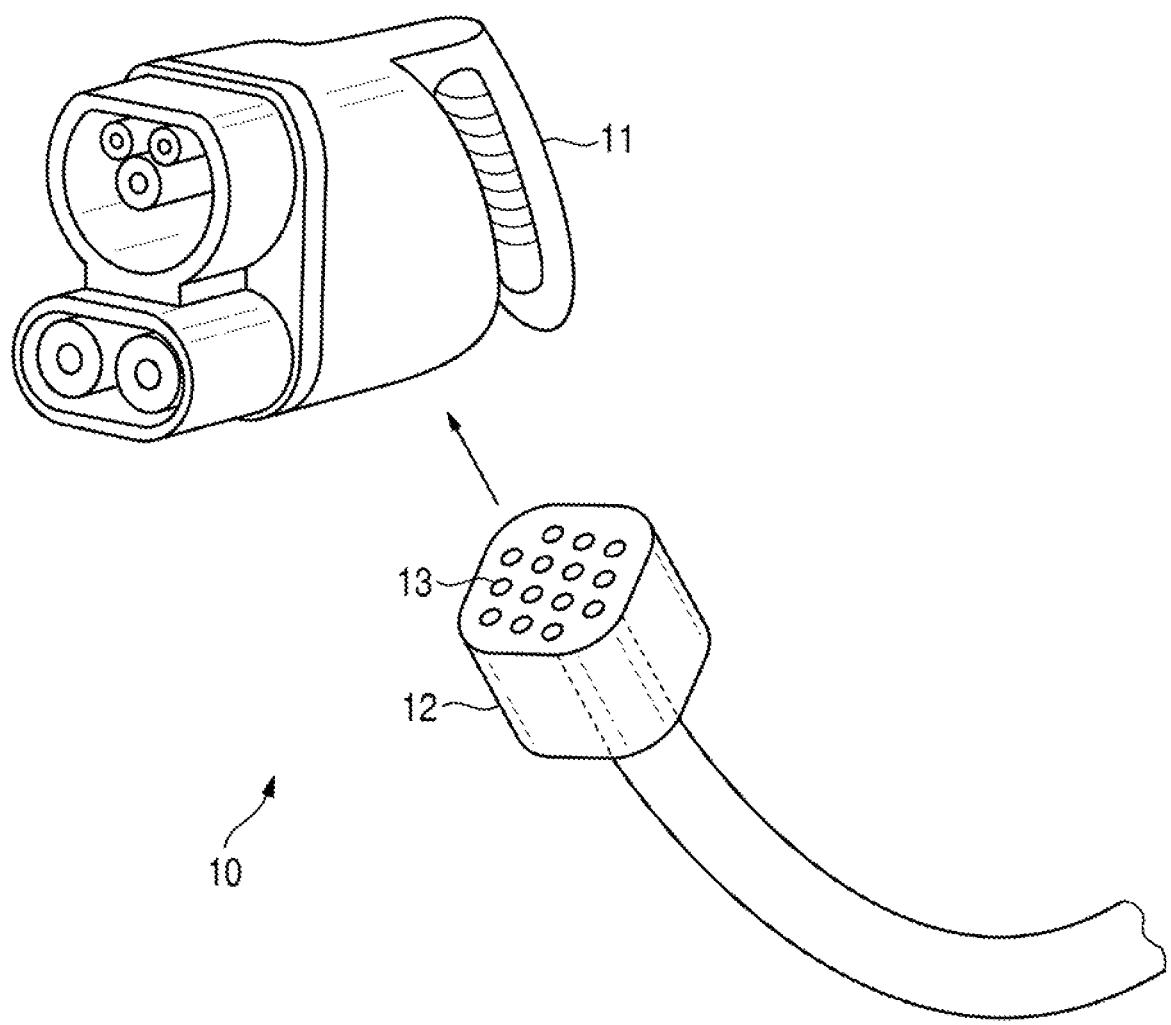
FIG. 1 shows the example of an inventive CCS charging cable according to EN 62196 type 2 ("IEC type 2") with a detached plug-type connector.

FIG. 1 illustrates the inventive addition of a charging cable (10) by an additional plug-type connector (12) by means of which the contact pins which are subjected to high level abrasion and the shell can equally be embodied as a replaceable wear part. The contact pins or contact openings (13) of the proposed plug-type connector (12) can in this context be configured for very few plugging cycles. The actual charging plug which is plugged on as an insulating body (11) can, in contrast, be fabricated with respect to its expected wear using more favorable pins and a more favorable plastic.

In order to prevent disconnection of the plug-type connector (12) by unauthorized persons, for example safety screws which cannot be released with a standard tool or a lock are provided. In order to detect unplugging and aborting of the charging process as a result of the voltage being switched off, the charging cable (10) additionally has either a separate interlock loop, for example in the form of a short-circuiting link, or is pulled through by the interlock loop of a superordinate charging system. The external region of the coupling preferably dips into the insulating body (11) at least over a certain distance which depends on the tracking resistance of the insulating material which is used.

Figure 2:
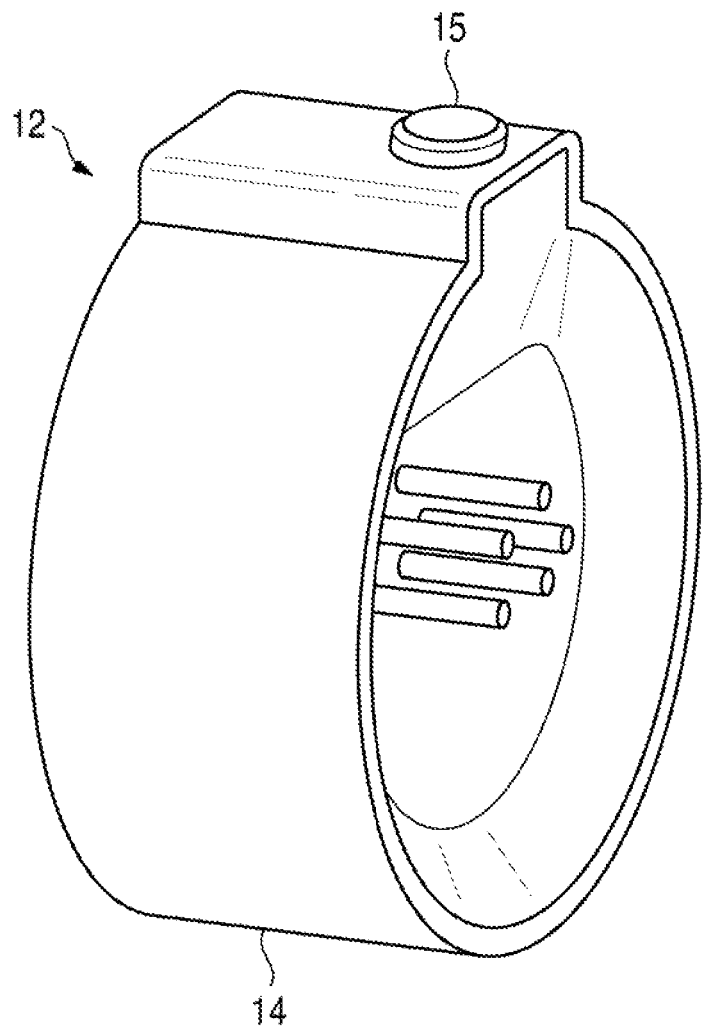
FIG. 2 shows the coupling of the plug-type connector in its details according to a first embodiment of the invention.
Figure 3:
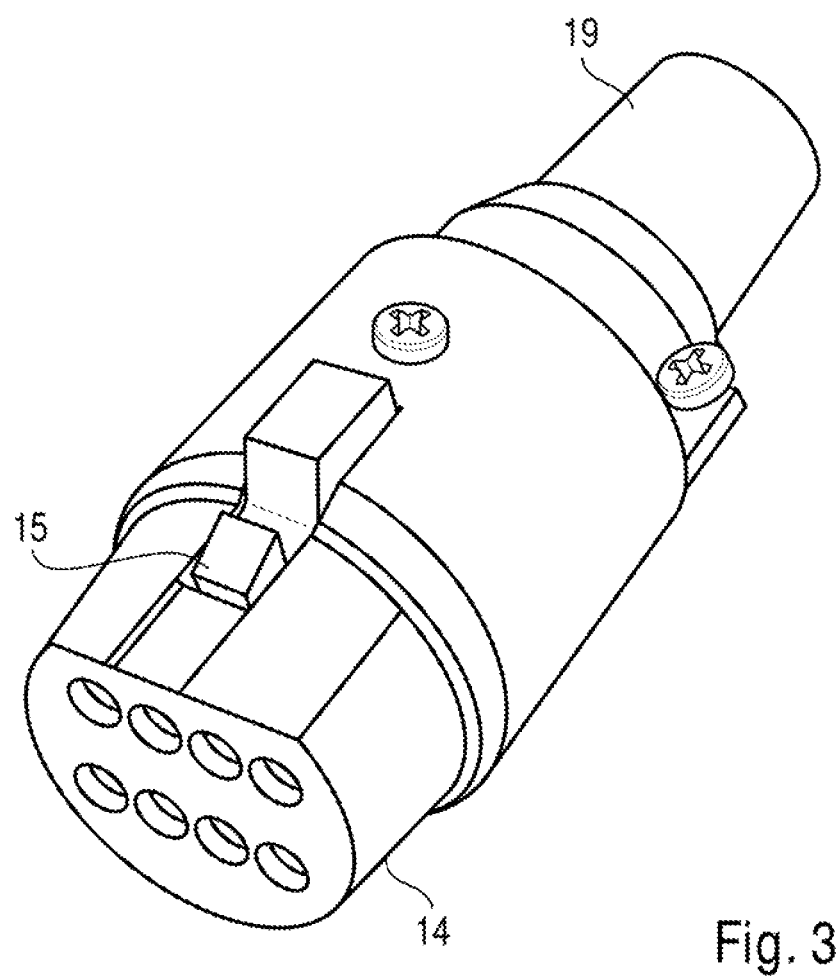
FIG. 3 shows the coupling of the plug-type connector in its details according to a second embodiment of the invention.

FIGS. 2 and 3 illustrate in detail the collar (14) which is countersunk for this purpose and which at the same time prevents a situation in which, when the plug-type connector (12) is slightly opened the pins can be touched before the flow of current through the interlock loop is safely interrupted. In this illustration it is also possible to see the optional locking means (15), which are provided here by the bolt of a lock.

Figure 4:
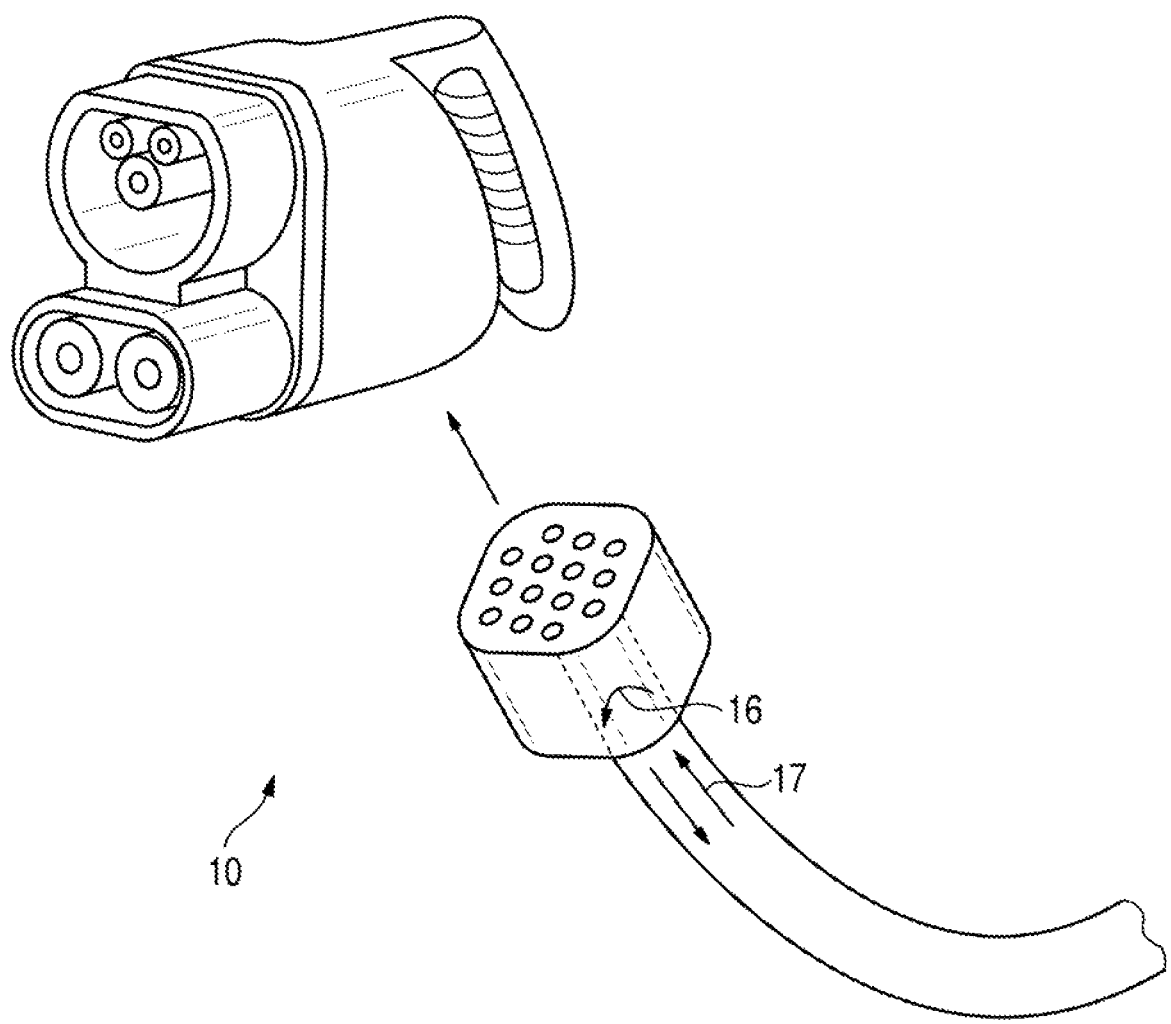
FIG. 4 shows a first embodiment variant of the CCS charging cable.
Figure 5:
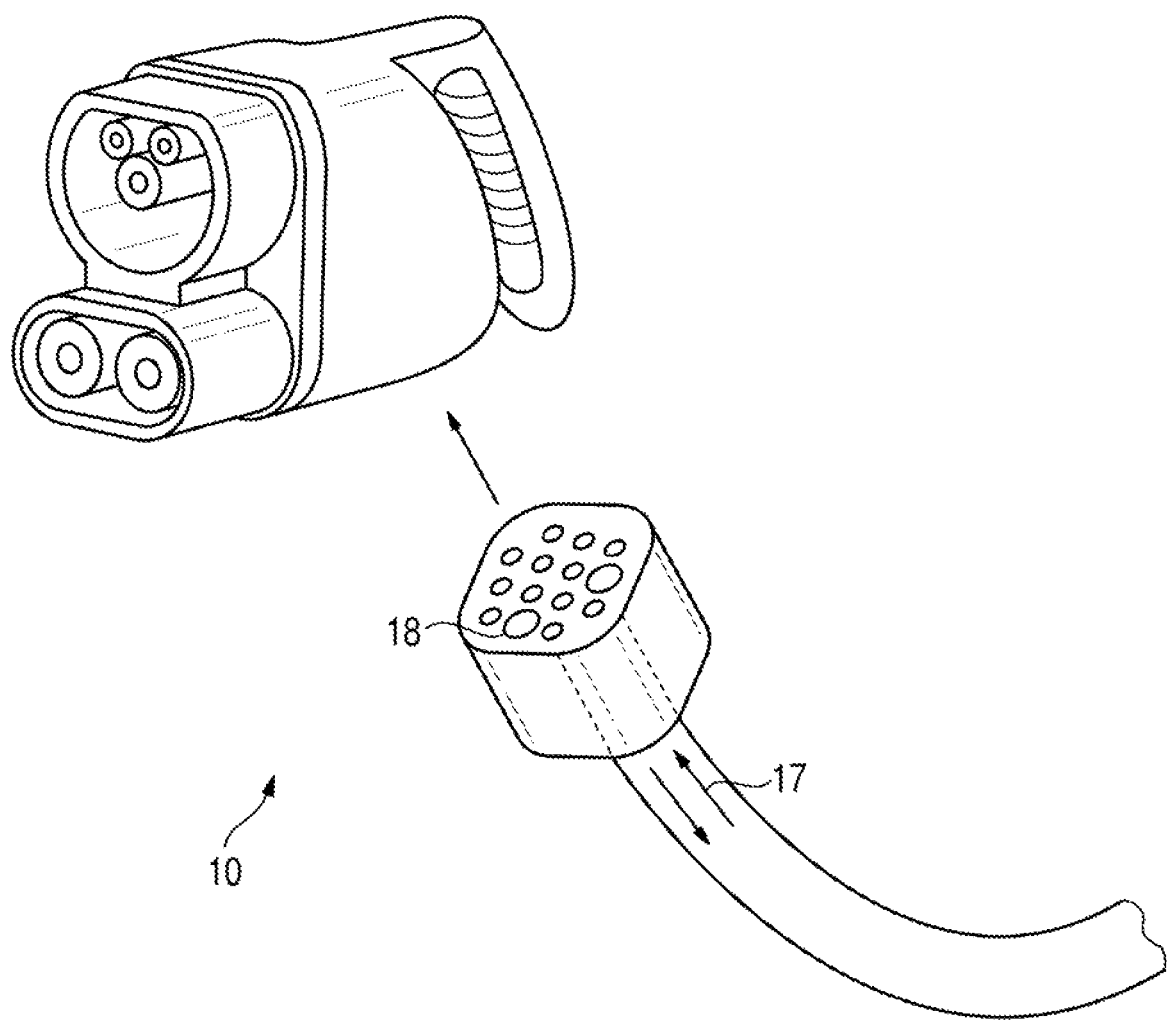
FIG. 5 shows a second embodiment variant of the CCS charging cable.

FIGS. 4 and 5 show two optional embodiment variants of a possible cable cooling system for the connecting line (19—FIG. 3). The latter preferably ends, as illustrated in FIG. 4, in the plug-type connector (12) which for this purpose merely forms a connection (16) of the inflow and outflow (17). The inflow and outflow may be provided in the form of one or more conduits for transporting fluid. Therefore, the costs of fluid couplings are saved if no transfer of the cooling medium to the vehicle is provided. The cooling of the connecting line (19) permits its cable weight to be reduced by decreasing a cross section here, while the cables in the insulating body (11) should have a significantly larger conductor cross section which ideally corresponds to the standard values for the case of pure air convection.

If the cooling medium is nevertheless to be transported into the insulating body (11), the solution according to FIG. 5 provides the advantage that fluid couplings (18) can be used as which are cost effective, non-leakage-free or even non-locking. Possible air pockets can be reliably eliminated by the service technician, for example by venting the cooling system.

What is claimed is:

1. A charging cable for an electric car, the charging cable comprising:
    an insulating body that is configured to be directly and detachably connected to the electric car, the insulating body having one of contact pins and contact openings,
    a connecting line, and
    a plug-type connector mounted to the connecting line, the plug-type connector having the other of the contact pins and the contact openings, wherein the plug-type connector detachably connects the insulating body to the connecting line via the contact pins and the contact openings, the plug-type connector being both directly and detachably connected to the insulating body, and wherein the connecting line is not connected between the plug-type connector and the insulating body,
    wherein the connecting line has an inflow and outflow for cooling fluid,
    wherein the plug-type connector comprises a fluidic connection of the inflow and outflow, and
    wherein the fluidic connection is defined within the plug-type connector and the inflow and outflow terminate in the plug-type connector,
    wherein the insulating body comprises a shell having a front side including a connector for connecting to the electric car, a rear side having a handle and a bottom side connected to the plug-type connector, wherein said one of the contact pins and the contact openings of the insulating body are contained within said shell.

2. The charging cable as claimed in claim 1, wherein the contact pins are connected to the insulating body.

3. The charging cable as claimed in claim 1, wherein the plug-type connector has a collar, and the plug-type connector is shaped such that the collar extends into the insulating body when the insulating body is connected to the connecting line.

4. The charging cable as claimed in claim 3, wherein the collar has a mechanical locking means.

5. The charging cable as claimed in claim 4, wherein the mechanical locking means is a lock.

6. The charging cable as claimed in claim 1, wherein the contact pins or the contact openings of the insulating body has a nickel-gold surface.

7. The charging cable as claimed in claim 1, wherein the insulating body and the plug-type connector are directly connected together by the contact pins and the contact openings.

8. The charging cable as claimed in claim 1, wherein the insulating body and the plug-type connector are not connected by a cable.

9. The charging cable as claimed in claim 1, wherein the other of the contact pins and the contact openings are at least partially positioned within the shell when the insulating body and the plug-type connector are directly connected together.

10. The charging cable as claimed in claim 1, wherein the shell houses the connector for connecting to the electric car and the plug-type connector.

11. The charging cable as claimed in claim 1, wherein the shell is composed of plastic.

* * * * *